United States Patent Office 3,004,219
Patented Oct. 10, 1961

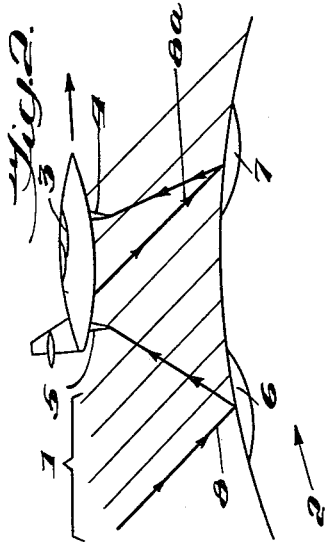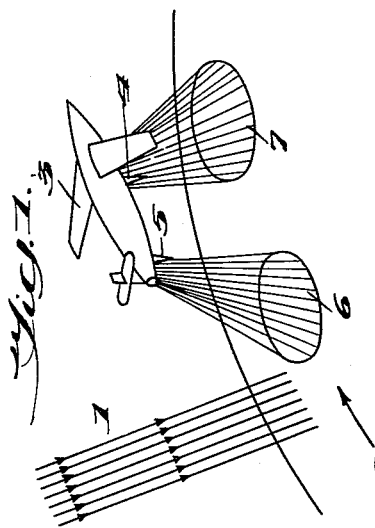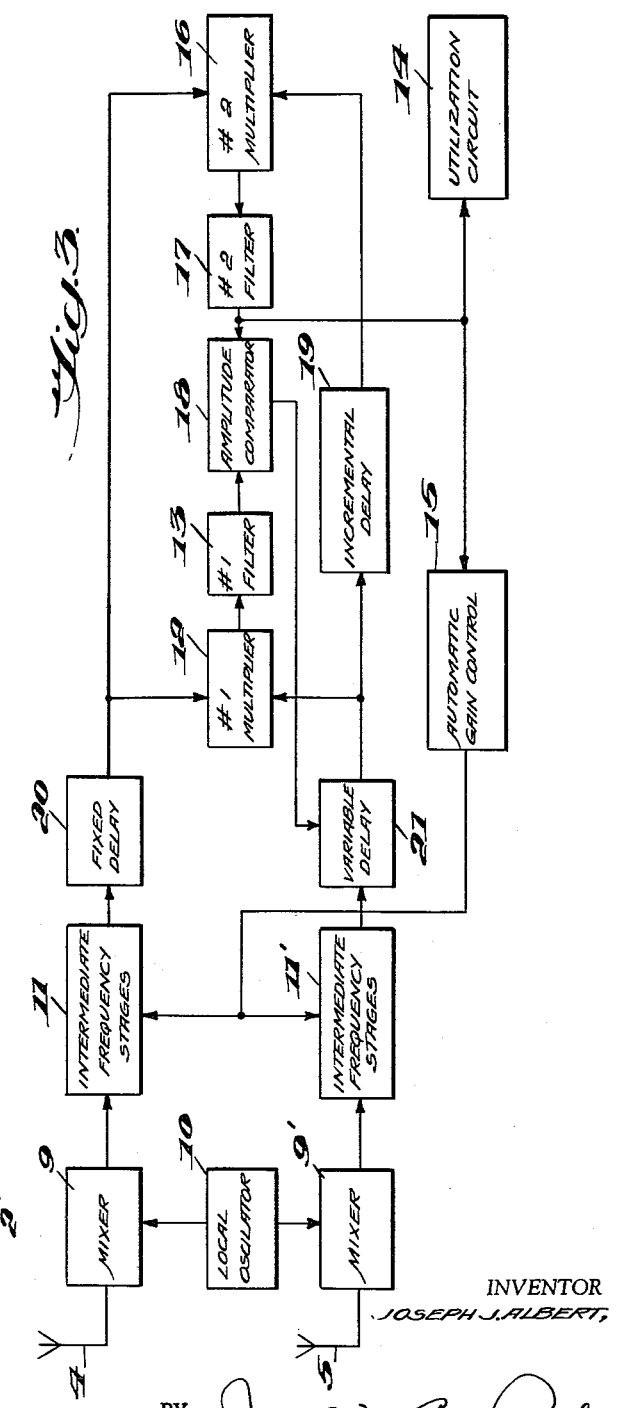

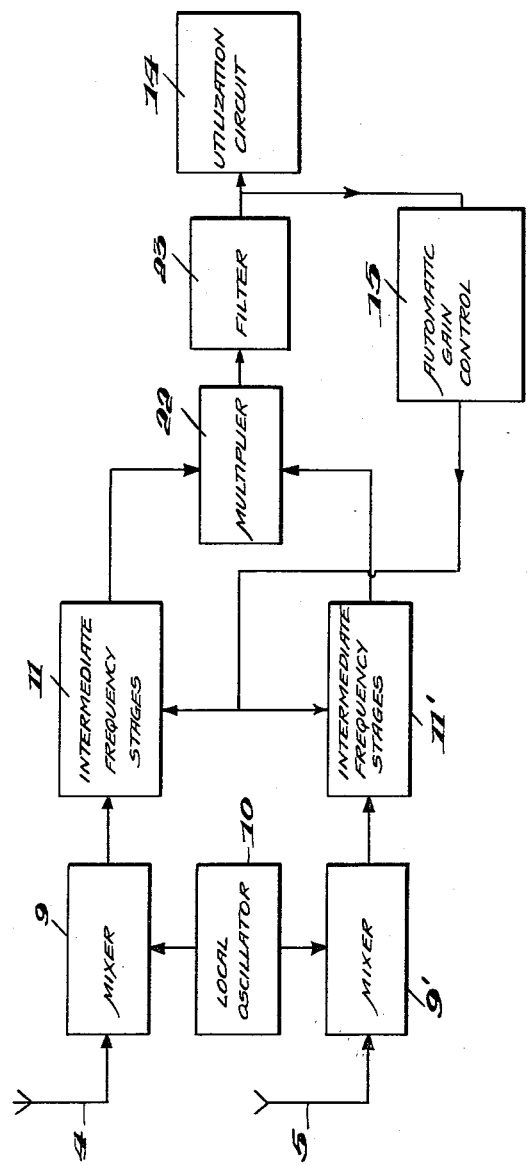

3,004,219
NONRADIATING VELOCITY DETECTION SYSTEM
Joseph J. Albert, Timonium, Md., assignor to The Martin Company, a corporation of Maryland
Filed Feb. 3, 1956, Ser. No. 563,253
25 Claims. (Cl. 324—70)

This invention relates to velocity detection systems for vehicles, and in particular to radar systems for detecting the Doppler shift occurring in reflected cosmic radiation arriving at a moving vehicle.

This is a continuation in part of the copending application to Joseph J. Albert, Serial No. 462,705, filed October 18, 1954, now abandoned, entitled "Nonradiating Velocity Detection System." With the exception of methods and means found in the copending application, Doppler navigation systems heretofore have radiated energy from the antenna of a moving aircraft and have measured the Doppler frequency shift of the received signals to determine velocity.

This, of course, necessitates the inclusion in these systems of means for generating and transmitting the proper frequencies. It will be evident that in aircraft applications, particularly military aircraft such as remotely guided missiles, the elimination of these transmitter stages would effect an extremely desirable reduction in the weight and size of each such apparatus and materially increase the pay load of the aircraft. The possibility of deriving the Doppler frequency shift from radiations which originate outside the aircraft, and thus eliminating entirely the need for an airborne transmitter, offers obvious benefits. And, equally important in such military applications, is the freedom from enemy detection which accompanies nonradiating systems. The absence of a transmitted signal can defeat detection by conventional methods, and render "jamming" by the enemy almost impossible. Also, a solution is provided to the problem of hostile missiles which attempt to pursue and destroy guided missiles by "homing" on the transmitted signal thereof. Therefore, this invention contemplates the use of free atmospheric radiation to derive the Doppler frequency shift. This free atmospheric radiation, or cosmic radiation, as it is sometimes referred to, is known to originate far away, perhaps beyond our own galaxy, and to approach the earth's atmosphere from certain directions with approximate uniformity. Furthermore, these emanations are received with approximately constant strength over all parts of the earth's surface. This cosmic radiation does not invariably occur at one characteristic frequency, but occurs mainly over a band of extremely high frequencies known as microwave frequencies. During daylight hours the sun has been shown to represent the major source of this microwave radiation. For purposes of this specification, the term "microwave frequency" is taken to comprehend those frequencies above 1000 megacycles.

Because of the essentially random nature of the energy which is transmitted by this complex mixture of frequencies, and by analogy to phenomena occurring in the audible frequency range, this cosmic radiation has been characterized as noise.

This energy distribution over a band of frequencies is somewhat analogous to that occurring in the random noise which is caused in radio receivers by thermal agitation, shot effect, and the like, as will be apparent to those skilled in the art.

At least two types of cosmic noise have been detected in radio receivers. The first of these evinces a marked spatial effect, seeming to originate mainly in the general direction of the Milky Way, and occurs at 150 and 200 megacycles. The second of these types is characterized as thermal and is thought to be a species of solar radiation from the celestial bodies themselves. This type occurs from 3000 to 30,000 megacycles. It is sufficient to state, for purposes of this specification, that the cosmic noise has shown itself to be a species of microwave radiation which is amenable to detection and amplification by radio receiver. Further, for purposes of this specification, the terms "cosmic noise," "cosmic radiation," and "free atmospheric radiation" are used interchangeably and are to be considered substantally equivalent.

Accordingly, therefore, the primary object of this invention is to utilize free atmospheric radiation as a source for signals from which a vehicle can derive a velocity signal.

Another object of this invention is to derive from cosmic noise a velocity signal which is adapted for immediate transmission from a guided missile to a remote base to modulate the guidance signals originating therefrom.

A further object of this invention is to derive significant Doppler velocity information from the output of a correlation detector which derives the filtered product of the time functions which are received as reflected cosmic noise at the fore and aft antennae respectively.

A still further object of this invention is to utilize the Doppler frequency shift occurring at each of two vehicle antennae solely by virtue of reflected extraterrestrial radiation to secure a double Doppler effect which directly reflects the velocity of the aircraft.

With the foregoing and other objects in view, which will be made manifest in the following detailed description and claims, reference is now had to the accompanying drawings:

FIGURE 1 is a pictorial representation of an aircraft, showing the fore and aft receiving antennae with their associated directive patterns;

FIGURE 2 is a diagrammatic representation of the reception by the aircraft of reflected components of cosmic noise;

FIGURE 3 is a schematic representation of the circuits used to derive information on the velocity from the received cosmic radiation; and FIGURE 4 is a schematic representation of a modified version of the circuit of FIGURE 3.

Referring now to the accompanying drawings, wherein similar reference characters indicate similar elements throughout:

In FIGURE 1 the numeral 1 indicates diagrammatically the passage of earth-bound cosmic radiation. Above the surface of the earth, as generally indicated by the numeral 2, is shown aircraft 3 provided with fore and aft antennae 4 and 5 respectively. Each of said antennae is effectively shielded from the direct radiation and is highly directive. Hence, it will be appreciated that the function of each antenna is to intercept energy that is radiated from the surface of the earth scanned thereby. The cosmic radiation, by virtue of its occurrence in the extremely high frequency ranges of the electromagnetic spectrum, is characterized by extremely short wave lengths and has a tendency to display reflective properties similar to those of light waves. Inasmuch as the suface of the earth, as used herein, comprises buildings, mountains, etc., the energy is reradiated in a scattered manner. Therefore, each antenna will respond as though the earth comprised a multitude of tiny elemental reflectors.

Below the aircraft, on the surface of the earth, is shown a rear directive pattern 6 and a forward directive pattern 7. It will be appreciated that the patterns 6 and 7 as shown are merely an illustrative representation, and that more than one such pattern fore or aft of the airplane may equally well be used. Each directive pattern defines the ground area subtended by the radiation pattern of its associated antenna. A substantial amount of illumination and consequent reflection will, of course, occur within the ground areas defined by the said directive patterns. The receiving antenna 4 and its counterpart 5 are proportioned so as to possess a very high degree of directivity. The sharpness of the radiation pattern, and hence the area of the directive patterns 6 and 7, is held within close limits. This permits each antenna to abstract maximum energy from the reflective components rebounding from within its associated directive pattern and to reject reflected radiant energy from the ground area outside of this zone.

Proceeding now to the detailed explanation of the theory of operation of the system and the disclosed circuitry:

In FIGURE 2 is shown generally by the numeral 1 the earth-bound atmospheric radiation, or cosmic noise, as the latter term has been defined in this specification. Aircraft 3 is moving with some given velocity. At the precise instant shown, a direct component 8 has struck an elemental reflector within the aft directive pattern 6 and has rebounded toward the aft antenna 5. It will be appreciated that the reflected component of cosmic noise contains precisely the same frequency values as the direct component. In other words, the direct component of the cosmic noise, comprising microwave energy distributed over a wide frequency band, has merely been deflected and propagated in a different direction.

Simultaneously with the above occurrence, other direct components of cosmic noise 8a from the same common remote source have struck elemental reflectors within the forward directive pattern 7, and have rebounded toward the forward antenna 4.

Antenna 5, however, is receding from the instantaneous point source of its radiation, while antenna 4 effectively advances upon its radiation source. According to the well-known Doppler effect, a change in apparent frequency, due to relative motion with respect to the frequency source, will be apparent at each antenna. More specifically, each frequency in the reflected cosmic spectrum which is detected by the aft antenna 5 will be slightly lower than the value at which it left the earth 2 after rebound. Conversely, each of the frequencies in the said band which is detected by the fore antenna 4 will appear to be slightly higher than the actual frequency at which it was propagated from the earth after rebound.

Further, for any particular single frequency in said reflected cosmic spectrum, the incremental frequency reduction at aft antenna 5 for any instantaneous velocity, is identically equal to the incremental frequency increase at the forward antenna 4, the only difference between the two being the subtractive nature of the former and the additive nature of the latter. In accordance with the principles of the Doppler effect it will be seen that this incremental frequency change is directly dependent upon velocity, and that as the aircraft velocity increases, the deviation between the received frequency and the actual propagation frequency of the reflected component will vary proportionately. Thus, for each such single frequency, there appears with increasing velocity a successively lower apparent frequency at the aft antenna, a successively higher apparent frequency at the forward antenna, and a frequency difference between the two which varies directly with the said velocity. It is noteworthy that the use of the Doppler shift in cosmic noise frequencies is not limited to determining the axial velocity, and that in systems using a pair of symmetrical directive patterns and antennae at the rear as well as the front of the aircraft, the lateral velocity or drift angle of a missile may be readily detected.

In FIGURE 3 is shown a receiver system in which the increased and decreased frequencies are simultaneously correlated to derive the output signal as a function of velocity. Because of the extreme breadth of the frequency band in which radiation of cosmic noise occurs, the receiver is adjusted to accept only those frequencies within a very narrow band of, say, 5 megacycles. The method by which the receiver accomplishes this band-limiting is explained more fully below. The process of correlation, as above referred to, is defined for purposes of this specification as the operation of deriving the filtered product of the two time functions received at the respective antenna. This invention contemplates the multiplication of the inputs to the two antennae, followed by the filtering thereof, to derive an output signal. This process constitutes correlation detection of the cosmic noise, as will be explained in more detail hereinafter.

Referring again to FIGURE 3 in the accompanying drawings, reflective components from the aft directive pattern 6 impinge upon the aft antenna 5, while simultaneously other reflective components from the forward directive pattern 7 impinge upon the forward antenna 4. The higher frequency signals incident upon the fore antenna 4 are fed to the mixer stage 9. For practical purposes it is necessary to translate, or shift the position of the signal in the frequency spectrum. This is accomplished by the interaction of the signal in the mixer stage 9 with oscillations delivered thereto from local oscillator 10, as a result of which there is derived a predetermined lower fixed frequency band. These resulting lower frequencies are defined for purposes of this specification as the intermediate frequency band.

This preset group of frequencies is delivered from the mixer stage 9 to the intermediate frequency stage 11, which said stage comprises one or more steps of amplification, and may be adjusted or tuned to selectively accentuate only the frequencies in a given narrow band, and substantially reject all other frequencies. Corresponding to this limited band of intermediate frequencies there will obviously exist a narrow band of the higher cosmic noise frequencies to which the receiver will display maximum receptivity. The correlation detector is thus tuned to a single band-center frequency, with a narrow pass-band on either side. It will be appreciated that the Doppler shift of the band-center frequency is small compared to the total band width, and that the several received frequencies on either side of the band-center frequency exhibit a Doppler shift which closely approximates that of the band-center frequency. The total band will comprise a pass-band of microwave frequencies, as explained earlier in this specification, and the receiver will substantially reject all frequencies outside this band. It will be obvious that the receiver band width must be broad enough to pass both the highest and lowest apparent frequency appearing at the respective antenna by virtue of the corresponding extremes in velocity.

Simultaneously with the above operation, the lower frequency signals within the prescribed band-limit, which are received on the aft antenna 5, are applied to the mixer stage 9', and are reduced therein to a lower position in the frequency spectrum by interaction with the oscillations from local oscillator 10. The output from the mixer stage 9' is then amplified and accentuated in the intermediate frequency stage 11'.

To summarize thus far, the lower frequencies received at the aft antenna and the higher frequencies received at the forward antenna are simultaneously subjected to the series of steps comprising reduction to a lower position in the frequency spectrum and amplification of the resulting intermediate frequency band. It will be appreciated that the frequency translation effected by interaction with local oscillator 10 does not cause the waves to lose the characteristic Doppler frequency differential which exists between them by virtue of the aircraft velocity. After reduction to a lower portion of the spectrum, the wave frequencies are still displaced by an interval solely dependent on velocity.

As an understanding of the basic fundamentals of correlation detection is necessary to fully comprehend the present invention, a somewhat simplified explanation of correlation detection is presented at this point.

Assume that a continuous carrier signal is multiplied by itself. As the signals are in phase, the product will contain positive excursions only which, when filtered, will produce a positive D.C. voltage output. If one of the signals is delayed by phase angle $\theta = 180°$, a negative D.C. voltage output will be produced by the filter. It is therefore obvious that the filtered product of the signals will oscillate, with a constant level envelope, as a function of the delay, which may be referred to as phase angle $\theta$.

If the aforementioned signal is the carrier for a series of pulses and the series of pulses is multiplied by itself, the filtered product will be positive in polarity but smaller in amplitude because of the long time intervals between pulse pairs. Now assume that the carrier and pulses of one of the signals are delayed a like amount by a phase angle $\theta$. It will be appreciated, in view of the discussion in the above paragraph, that the output of the filter will oscillate as a function of the delay, or phase angle $\theta$, between the carriers. Because the pulses are also delayed, the intervals of time over which a product is produced will decrease as a function of the phase angle $\theta$, and consequently, the envelope of the filtered output will decrease in a linear fashion until the output equals zero at the point where the delay equals $$\left(\frac{1}{\text{pulse length}}\right)$$

As the output is a function of the phase angle $\theta$, a mirror image of the output will be produced for negative values of $\theta$. The total output is called the autocorrelation function of a pulsed carrier.

Now assume that two series of pulsed carrier signals are available which are fixed in pulse time relationship but the frequency of one carrier signal is slightly different from the other. Within any particular pair of pulses the phase angle between the carrier signals will change an infinitesimal amount and consequently for all practical purposes the phase angle between these carrier signals is constant throughout the pulse pair. Because the pulses are spaced at time intervals which are large relative to the pulse length, there will be a change in the phase angle between the carriers of any pair of pulses and a succeeding pair of pulses. Referring back to the previous paragraph, it will be remembered that the envelope of the filtered output is determined by the amount of pulse overlap occurring in a pulse pair and that the polarity and relative amplitude of the filtered output is a function of the phase angle $\theta$ between the carrier signals. With this thought in mind, it will be readily appreciated that under the conditions set forth in this paragraph, the maximum amplitude of the filtered output will be limited by the time relationship between the pulses of a pulse pair and that the polarity and the relative amplitude of the instantaneous output will be a function of the phase angle between the carrier signals. Therefore the filtered output of the product of two series of pulses having a fixed time relationship and carrier frequencies relatively close together will be oscillatory with a maximum amplitude that is determined by the pulse time relationship and the frequency of which will be the difference between the carrier frequencies.

If a random function noise signal which has been passed through a single resonance bandpass filter is multiplied by itself, the rate of decay of the envelope of the autocorrelation function will be exponential in form wherein the exponent will be a function of the bandwidth of the single resonance filter and the delay between the noise signals. Therefore, it is obvious that the bandwidth of the single resonance filter will determine the delay that may be tolerated between an original noise signal and a delayed copy thereof. If the frequencies of one of the noise signals are slightly changed (as by Doppler effect) a phenomenon similar to that described in the above paragraph will occur.

Although a random function noise signal which has been passed through a single resonance bandpass filter was used as an example in the above paragraph, other filters may be employed as appreciated by those skilled in the art. Obviously, the envelope of the correlation function will be of a different form.

With this simplified explanation of correlation detection, the operation of the remaining portion of the invention will be more easily understood.

It was previously stated that the cosmic radiation approaches the earth with approximate uniformity of direction and intensity, and is reflected at the same frequency but in a scattered manner because of earth irregularities. But if the wave front does not approach the earth in a fashion so that it is parallel to the relatively small surface of the earth in question, the signals received by one of the antennae 4 and 5 (assuming the aircraft 3 is not in motion) will lag behind that received by the remaining one. It is therefore obvious that if this delay, which has been expressed as phase angle $\theta$, is too large the autocorrelation filtered product will be below a usable level. As the magnitude of the delay is a function of the angle of the approching energy and the height of the aircraft 3, it is necessary to provide delay means within the system that will maintain the time delay or phase angle $\theta$ constant and within certain limits.

Referring again to FIG. 3, the output of intermediate frequency stages 11 is coupled into a fixed delay means 20, while the output from the intermediate frequency stages 11' is coupled into a variable delay means 21. The fixed delay means 20 provides approximately one-half of the maximum delay provided by the variable delay means 21, which will provide both positive and negative phase shift of the signal in the lower channel with respect to the signal in the upper channel. The outputs from these delay means are coupled into a #1 multiplier 12, the output of which, when filtered by a #1 filter 13, produces an autocorrelation function. The output from the variable delay means 21 is also coupled into an incremental delay means 19. The outputs from the incremental delay means 19 and the fixed delay means 20 are coupled into a #2 multiplier 16, the output of which, when filtered by a #2 filter 17, provides a second autocorrelation function. Filters 13 and 17 generally may comprise bandpass filters of relatively narrow bandwidth, and, because the difference frequency inherently reflects changes in velocity, must be continuously tuned. The conventional Doppler frequency tracking system of the type used in other Doppler navigators are well suited for this purpose. These systems are well known to those skilled in the art, and no claim herein is directed to the structure thereof.

The correlation outputs of the filters 13 and 17 are coupled into an amplitude comparator 18, the output of which is coupled as a control signal into the variable delay means 21.

The incremental delay means 19 introduces an additional delay to the output signal of the variable delay means 21. Because of this, when the variable delay means 21 has been adjusted to reduce the output signal from the comparator 18 to zero (i.e., when the system is balanced), the delay introduced by the variable delay means 21 will produce a phase difference between the outputs of fixed delay means 20 and variable delay means 21 that will be one half of the difference introduced by the incremental delay means 19. This shift will be in a phase sense opposite to the phase of the output of the incremental delay means 19 with respect to the output of the fixed delay means 20. The ability of the variable delay means 21 to vary the output therefrom so that it may have either a positive or negative phase relationship with respect to the output from the fixed delay means 20 will be appreciated when it is remembered that the fixed delay means 20 introduces what essentially amounts to a shift in the phase reference, as described hereinbefore.

The above described phase shifting system is one of several methods for producing the necessary delay. For example, the range of variation in the variable delay means 21 may be reduced to one half of the range necessary in the arrangement shown (without reducing the range of operation of the equipment) by providing a bypass switching means for switching the fixed delay means 20 in and out of the system. The bypass switching means may be operated by one of three ways, namely: (a) limit switches on the variable delay means 21, (b) by the output from the filter means 13 or, (c) by the combined outputs from the filter means 13 and 17. Such control techniques are well known to those skilled in the art. Another method would move the incremental delay means 21 to provide the additional delay shift in the other input to the multiplier 16, while a further system would provide a second incremental delay means in the other input to the multiplier 16. A still further system would eliminate fixed delay means 20 and would switch variable delay means 21 from its illustrated position to the other channel where the fixed delay means 20 was located. The three above listed techniques for operating the bypass switch may be used here for operating the switching action. These and other methods are obvious to those skilled in the art.

The output of the filter stage 17 is sampled by automatic gain control detector 15, which dispatches the proper correctional signal to control the amplification in the intermediate frequency stages 11 and 11′, and compensate for fluctuations in the strength of the incoming signals in a manner well known to those skilled in the art.

The output of filter stage 17 is delivered to utilization circuit 14. This output signal directly reflects in a quantitative manner the velocity of the vehicle and is capable of either local or remote utilization. As applied to a guided missile, utilization circuit 14 may comprise means for immediately transmitting the velocity signal to a remote location and there utilizing it in determining the character of the guidance signals which may be transmitted to control the flight of a pilotless missile. In the self-contained guidance systems the output signal may be applied in the conventional manner to a computer which continuously determines either the distance traversed or the distance-to-target and accordingly delivers an actuating signal to the airfoil control system. Also, in the systems which utilize a pair of forwardly disposed directive patterns, and a similar pair of rearwardly disposed patterns, the output signal may be applied, via a computer, to correcting the drift angle from the preset course. In addition to these applications, the utilization circuit may equally well comprise indicating means for visual inspection of velocity values in a piloted aircraft, and the broad inventive concept of deriving the velocity from the free atmospheric radiation is by no means limited to pilotless missiles.

As mentioned hereinbefore, the time delay between the signals received by the antennae 4 and 5 is a function of the angle of the approaching energy and height of the aircraft 3. From this it is obvious that under certain combinations of the angle of the approaching energy and the height of the aircraft, the delay between the received signals will not require the use of delay means in the system. When these combinations occur, it is advantageous to eliminate the delay means and thereby reduce space and equipment requirements.

Referring to FIGURE 4, a modified version of the circuit of FIGURE 3 is presented which has had the delay means eliminated. The symbol numbers identical to those used in FIGURE 3 denote similar elements. The interconnections and operations of the antennae 4, 5, mixers 9, 9′, local oscillator 10, and intermediate frequency stages 11, 11′ are similar to those of the circuit of FIGURE 3. The outputs of the intermediate frequency stages 11, 11′ are coupled into a multiplier 22. The multiplier 22 functions in a manner identical to the multipliers 12, 16 of FIGURE 3, hereinbefore discussed. The output from the multiplier 22 is coupled into a filter 23, which functions in a manner similar to the filters 13, 17 of FIGURE 3 as discussed hereinbefore.

While the invention is illustrated in a guided missile, it should be obvious to those skilled in the art that this type of velocity detection could be readily applied to any vehicle in motion, and that certain changes, modifications, and substitutions can be made without departing from the spirit and scope of the appended claims. In particular, it should be noted that the application of the superheterodyne technique to the incoming microwave signals, while eminently practical and desirable, is not absolutely essential to the operation of the present invention. If the superheterodyne techniques are not employed, the bandpass characteristics inherent therein and discussed hereinbefore will be eliminated and must therefore be supplied by other means well known in the art. Likewise, it may be desirable to amplify the reflected cosmic noise signals rather than the intermediate frequency signals or to eliminate the amplifier entirely.

The references to the "fore" and "aft" antennae found in this description and in the subjoined claims will be understood to refer to the directional orientation of the antennae with respect to the velocity to be measured, rather than having any relation to their mounting location on the aircraft, since such antennae may be placed in closely adjacent positions at one end of the aircraft or even reversed so that the pattern of a forwardly positioned antenna defines a rearwardly located ground area and vice versa.

It will be understood that the description of the invention herein has been confined to the novel aspects of the method and device, and that for information concerning incidental refinements such as correction for the altitude of the aircraft and the like, reference may be had to conventional Doppler navigating techniques.

What is claimed is:

1. A system for obtaining an electrical signal dependent upon the velocity of a vehicle which comprises a first antenna for receiving a group of reflected cosmic noise signals in the radio frequency band, a second antenna for simultaneously receiving a similar group of radio frequency signals arriving at said vehicle from a direction which is displaced substantially 180° in a horizontal plane with respect to the direction of arrival of said first group of signals, means for simultaneously reducing the frequencies of said groups of cosmic noise signals to produce respective groups of intermediate frequency signals, means for simultaneously acting on said groups of intermediate frequency signals to provide respective signals which have a phase angle therebetween that will permit autocorrelation detection thereof, means for multiplying said respective groups of signals to form an instantaneous product function, and means for filtering said instantaneous product function, whereby said respective groups of signals are autocorrelated to provide the electrical signal as an index to velocity.

2. A system for obtaining an electrical signal dependent upon the velocity of a vehicle which comprises an aft-directed antenna for receiving a group of reflected cosmic noise signals in the radio frequency range, a fore-directed antenna for simultaneously receiving a similar group of radio frequency signals, means for simultaneously reducing the frequencies of said groups of cosmic noise signals to produce respective groups of intermediate frequency signals, means for simultaneously acting upon said groups of intermediate frequency signals to provide respective groups of signals which have a phase angle therebetween that will permit autocorrelation detection thereof, means for multiplying said respective groups of signals to form an instantaneous product function, and means for filtering said instantaneous product function, whereby said respective groups of signals are autocorrelated to provide the electrical signal as an index to velocity.

3. A system for obtaining an electrical signal dependent upon the velocity of a vehicle which comprises an antenna for receiving a group of reflected cosmic noise signals in the radio frequency range, a second antenna for simultaneously receiving a similar group of signals arriving at said vehicle from a direction which is displaced substantially 180° in a horizontal plane with respect to the direction of arrival of said first group of signals, means for simultaneously reducing the frequencies of said groups of cosmic noise signals to produce respective groups of intermediate frequency signals, means for simultaneously amplifying said groups of intermediate frequency signals, means for delaying at least one of said groups of intermediate frequency signals so that the phase angle therebetween is reduced to permit autocorrelation detection thereof, means for multiplying the two amplified groups of intermediate frequency signals to form an instantaneous product function, and means for filtering said instantaneous product function, whereby said groups of intermediate frequency signals are autocorrelated to provide the electrical signal as an index to velocity.

4. A system for obtaining an electrical signal dependent upon the velocity of a vehicle which comprises an aft-directed antenna for receiving a group of reflected cosmic noise signals in the radio frequency band, a fore-directed antenna for simultaneously receiving a similar group of signals, means for simultaneously reducing the frequencies of said groups of cosmic noise signals to produce respective groups of intermediate frequency signals, means for simultaneously amplifying said groups of intermediate frequency signals, means for delaying at least one of said groups of intermediate frequency signals so that the phase angle therebetween is reduced to permit autocorrelation detection thereof, means for multiplying the two amplified groups of intermediate frequency signals to form an instantaneous product function, and means for filtering said instantaneous product function, whereby said groups of intermediate frequency signals are autocorrelated to provide the electrical signal as an index to velocity.

5. A means for obtaining an electrical signal dependent upon the velocity of a vehicle comprising a first antenna for receiving a group of reflected cosmic noise signals in the radio frequency band, a second antenna for receiving a similar group of signals arriving at said vehicle from a direction which is displaced substantially 180° in a horizontal plane with respect to the direction of arrival of said first group of signals, a first mixer stage having one input connected to said first antenna, a second mixer stage having one input connected to said second antenna, a local oscillator connected to the remaining inputs of said mixer stages, a first variable gain amplifier stage having its controlled input connected to the output of said first mixer stage, a second variable gain amplifier stage having its controlled input connected to the output of said second mixer stage, a fixed delay means connected to the output of one of the said amplifier stages, a variable delay means having its controlled input connected to the output of the remaining amplifier stage, first and second multiplier stages having one input of each connected to the output of said fixed delay means, means connecting the remaining input of one of said multiplier stages to the output of said variable delay means, an incremental delay means connected to said output of said variable delay means, means connecting the remaining input of remaining one of said multiplier stages to the ouput of said incremental delay means, a first filter means having its input connected to the output of said first multiplier stage, a second filter means having its input connected to the output of said second multiplier stage, an amplitude comparator means having one of its inputs connected to the output of said first filter means and its remaining input connected to the output of said second filter means, means connecting the output of said amplitude comparator means to the controlling input of said variable delay means, an automatic gain control means having its input connected to the output of one of said filters and means connecting the output of said automatic gain control means to the controlling inputs of said amplifier stages, whereby said outputs of said filters deliver signals which reflect vehicle velocity.

6. A means for obtaining an electrical signal dependent upon the velocity of a vehicle comprising a first antenna for receiving a group of reflected cosmic noise signals in the radio frequency band, a second antenna for receiving a similar group of signals arriving at said vehicle from a direction which is displaced substantially 180° in a horizontal plane with respect to the direction of arrival of said first group of signals, a first mixer stage having one input connected to said first antenna, a second mixer stage having one input connected to said second antenna, a local oscillator connected to the remaining inputs of said mixer stages, a first variable gain amplifier stage having its controlled input connected to the output of said first mixer stage, a second variable gain amplifier stage having its controlled input connected to the ouput of said second mixer stage, a fixed delay means connected to the output of one of the said amplifier stages, a variable delay means having its controlled input connected to the output of the remaining amplifier stage, first and second multiplier stages having one input of each connected to the output of said variable delay means, means connecting the remaining input of one of said multiplier stages to the output of said fixed delay means, an incremental delay means connected to said output of said fixed delay means, means connecting the remaining input of remaining one of said multiplier stages to the output of said incremental delay means, a first filter means having its input connected to the output of said first multiplier stage, a second filter means having its input connected to the output of said second multiplier stage, an amplitude comparator means having one of its inputs connected to the output of said first filter means and its remaining input connected to the output of said second filter means, means connecting the output of said amplitude comparator means to the controlling input of said variable delay means, an automatic gain control means having its input connected to the output of one of said filters and means connecting the output of said automatic gain control means to the controlling inputs of said amplifier stages, whereby said outputs of said filters deliver signals which reflect vehicle velocity.

7. A means for obtaining an electrical signal dependent upon the velocity of a vehicle comprising a first antenna for receiving a group of reflected cosmic noise signals in the radio frequency range, a second antenna for receiving a similar group of signals arriving at said vehicle from a direction which is displaced substantially 180° in a horizontal plane with respect to the direction of arrival of said first group of signals, a first mixer stage having one input connected to said first antenna, a second mixer stage having one input connected to said second antenna, a local oscillator connected to the remaining inputs of said mixer stages, a first variable gain amplifier stage having its controlled input connected to the output of said first mixer stage, a second variable gain amplifier stage having its controlled input connected to the output of said second mixer stage, a fixed delay means connected to the output of one of the said amplifier stages, a variable delay means having its controlled input connected to the output of the remaining amplifier stage, a first multiplier stage having one of its inputs connected to the output of said fixed delay means and its remaining input connected to the output of said variable delay means, a first incremental delay means connected to said output of said fixed delay means, a second incremental delay means connected to said output of said variable delay means, a second multiplier stage having one of its inputs connected to the output of said first incremental delay means and its remaining input connected to the output of said second incremental delay means, a first filter means having its input connected to the output of said first multiplier stage, a second filter means having its input connected to the output of said second multiplier means, an amplitude comparator means having one of its inputs connected to the output of said first filter means and its remaining input connected to the output of said second filter means, means connecting the output of said amplitude comparator means to the controlling input of said variable delay means, an automatic gain control means having its input connected to the output of one of said filters and means connecting the output of said automatic gain control means to the controlling inputs of said amplifier stages, whereby said outputs of said filters deliver signals which reflect vehicle velocity.

8. A means for obtaining an electrical signal dependent upon the velocity of a vehicle comprising a first antenna for receving a group of reflected cosmic noise signals in the radio frequency range, a second antenna for receiving a similar group of signals arriving at said vehicle from a direction which is displaced substantially 180° in a horizontal plane with respect to the direction of arrival of said first group of signals, a first mixer stage having one input connected to said first antenna, a second mixer stage having one input connected to said second antenna, a local oscillator connected to the remaining inputs of said mixer stages, a first variable gain amplifier stage having its controlled input connected to the output of said first mixer stage, a second variable gain amplifier stage having its controlled input connected to the output of said second mixer stage, a fixed delay means having a bypass switching means, means connecting the input of said fixed delay means to the output of one of said amplifier stages, a variable delay means having its controlled input connected to the output of the remaining amplifier stage, first and second multiplier stages having one input of each connected to the output of said fixed delay means, means connecting the remaining input of one of said multiplier stages to the output of said variable delay means, an incremental delay means connected to said output of said variable delay means, means connecting the remaining input of the remaining one of said multiplier stages to the output of said incremental delay means, a first filter means having its input connected to the output of said first multiplier stage, a second filter means having its input connected to the output of said second multiplier stage, an amplitude comparator means having one of its inputs connected to the output of said first filter means and its remaining input connected to the output of said second filter means, means connecting the output of said amplitude comparator means to the controlling input of said variable delay means, a voltage sensing means connected to said outputs of said first and second filter means, means connecting the output of said voltage sensing means to said bypass switching means, an automatic gain control means having its input connected to the output of one of said filters and means connecting the output of said automatic gain control means to the controlling inputs of said amplifier stages, whereby said outputs of said filters deliver signals which reflect vehicle velocity.

9. A means for obtaining an electrical signal dependent upon the velocity of a vehicle comprising a first antenna for receving a group of reflected cosmic noise signals in the radio frequency range, a second antenna for receiving a similar group of signals arriving at said vehicle from a direction which is displaced substantially 180° in a horizontal plane with respect to the direction of arrival of said first group of signals, a first mixer stage having one input connected to said first antenna, a second mixer stage having one input connected to said second antenna, a local oscillator connected to the remaining inputs of said mixer stages, a first variable gain amplifier stage having its controlled input connected to the output of said first mixer stage, a second variable gain amplifier stage having its controlled input connected to the output of said second mixer stage, a fixed delay means having a bypass switching means, means connecting the input of said fixed delay means to the output of one of said amplifier stages, a variable delay means having its controlled input connected to the output of the remaining amplifier stage, first and second multiplier stages having one input of each connected to the output of said fixed delay means, means connecting the remaining input of one of said multiplier stages to the output of said variable delay means, an incremental delay means connected to said output of said variable delay means, means connecting the remaining input of the remaining one of said multiplier stages to the output of said incremental delay means, a first filter means having its input connected to the output of said first multiplier stage, a second filter means having its input connected to the output of said second multiplier stage, an amplitude comparator means having one of its inputs connected to the output of said first filter means and its remaining input connected to the output of said second filter means, means connecting the output of said amplitude comparator means to the controlling input of said variable delay means, a voltage sensing means connected to said output of said first filter means, means connecting the output of said voltage sensing means to said bypass switching means, an automatic gain control means having its input connected to the output of one of said filters and means connecting the output of said automatic gain control means to the controlling inputs of said amplifier stages, whereby said outputs of said filters deliver signals which reflect vehicle velocity.

10. A means for obtaining an electrical signal dependent upon the velocity of a vehicle comprising a first antenna for receiving a group of reflected cosmic noise signals in the radio frequency band, a second antenna for receiving a similar group of signals arriving at said vehicle from a direction which is displaced substantially 180° in a horizontal plane with respect to the direction of arrival of said first group of signals, a first mixer stage having one input connected to said first antenna, a second mixer stage having one input connected to said second antenna, a local oscillator connected to the remaining inputs of said mixer stages, a first variable gain amplifier stage having its controlled input connected to the output of said first mixer stage, a second variable gain amplifier stage having its controlled input connected to the output of said second mixer stage, a fixed delay means having a bypass switching means, means connecting the input of said fixed delay means to the output of one of said amplifier stages, a variable delay means having its controlled input connected to the output of the remaining amplifier stage, first and second multiplier stages having one input of each connected to the output of said fixed delay means, means connecting the remaining input of one of said multiplier stages to the output of said variable delay means, an incremental delay means connected to said output of said variable delay means, means connecting the remaining input of the remaining one of said multiplier stages to the output of said incremental delay means, a first filter means having its input connected to the output of said first multiplier stage, a second filter means having its input connected to the output of said second multiplier stage, an amplitude comparator means having one of its inputs connected to the output of said first filter means and its remaining input connected to the output of said second filter means, means connecting the output of said amplitude comparator means to the controlling input of said variable delay means, switching means associated with the extremities of said variable delay means and connected to said bypass switching means for operating said bypass switching means, an automatic gain control means having its input connected to the output of one of said filters and means connecting the output of said automatic gain control means to the controlling inputs of said amplifier stages, whereby said outputs of said filters deliver signals which reflect vehicle velocity.

11. A means for obtaining an electrical signal dependent upon the velocity of a vehicle comprising a first antenna for receiving a group of reflected cosmic noise signals in the radio frequency range, a second antenna for receiving a similar group of signals arriving at said vehicle from a direction which is displaced substantially 180° in a horizontal plane with respect to the direction of arrival of said first group of signals, a first mixer stage having one input connected to said first antenna, a second mixer stage having one input connected to said second antenna, a local oscillator connected to the remaining inputs of said mixer stages, a first variable gain amplifier stage having its controlled input connected to the output of said first mixer stage, a second variable gain amplifier stage having its controlled input connected to the output of said second mixer stage, first and second multiplier stages, connecting means joining one input of each of said multiplier stages to the output of one of said amplifier stages and the second input of one of said multiplier stages to the output of the remaining one of said amplifier stages, a variable delay means, said connecting means comprising a channel switching means to alternately switch said variable delay means in series with said outputs of said amplifier stages, an incremental delay means having its input connected to said second input of said one of said multiplier stages, means connecting the remaining input of remaining one of said multiplier stages to the output of said incremental delay means, a first filter means having its input connected to the output of said first multiplier stage, a second filter means having its input connected to the output of said second multiplier stage, an amplitude comparator means having one of its inputs connected to the output of said first filter means and its remaining input connected to the output of said second filter means, means connecting the output of said amplitude comparator means to the controlling input of said variable delay means, switching means associated with the zero delay extremity of said variable delay means and connected to said channel switching means for switching said variable delay means from one channel to the other, an automatic gain control means having its input connected to the output of one of said filters and means connecting the output of said automatic gain control means to the controlling inputs of said amplifier stages, whereby said outputs of said filters deliver signals which reflect vehicle velocity.

12. A means for obtaining an electrical signal dependent upon the velocity of a vehicle comprising a first antenna for receiving a group of reflected cosmic noise signals in the radio frequency range, a second antenna for receiving a similar group of signals arriving at said vehicle from a direction which is displaced substantially 180° in a horizontal plane with respect to the direction of arrival of said first group of signals, a first mixer stage having one input connected to said first antenna, a second mixer stage having one input connected to said second antenna, a local oscillator connected to the remaining inputs of said mixer stages, a first variable gain amplifier stage having its controlled input connected to the output of said first mixer stage, a second variable gain amplifier stage having its controlled input connected to the output of said second mixer stage, first and second multiplier stages, connecting means joining one input of each of said multiplier stages to the output of one of said amplifier stages and the second input of one of said multiplier stages to the output of the remaining one of said amplifier stages, a variable delay means, said connecting means comprising a channel switching means to alternately switch said variable delay means in series with said outputs of said amplifier stages, an incremental delay means having its input connected to said second input of said multiplier stage, means connecting the remaining input of the remaining one of said multiplier stages to the output of said incremental delay means, a first filter means having its input connected to the output of said first multiplier stage, a second filter means having its input connected to the output of said second multiplier stage, an amplitude comparator means having one of its inputs connected to the output of said first filter means and its remaining input connected to the output of said second filter means, means connecting the output of said amplitude comparator means to the controlling input of said variable delay means, switching means having its inputs respectively connected to said outputs of said filters and its output connected to said channel switching means for switching said variable delay means from one channel to the other, an automatic gain control means having its input connected to the output of one of said filters and means connecting the output of said automatic gain control means to the controlling inputs of said amplifier stages, whereby said outputs of said filters deliver signals which reflect vehicle velocity.

13. A means for obtaining an electrical signal dependent upon the velocity of a vehicle comprising a first antenna for receiving a group of reflected cosmic noise signals in the radio frequency range, a second antenna for receiving a similar group of signals arriving at said vehicle from a direction which is displaced substantially 180° in a horizontal plane with respect to the direction of arrival of said first group of signals, a first mixer stage having one input connected to said first antenna, a second mixer stage having one input connected to said second antenna, a local oscillator connected to the remaining inputs of said mixer stages, a first variable gain amplifier stage having its controlled input connected to the output of said first mixer stage, a second variable gain amplifier stage having its controlled input connected to the output of said second mixer stage, first and second multiplier stages, connecting means joining one input of each of said multiplier stage to the output of one of said amplifier stages and the second input of one of said multiplier stages to the output of the remaining one of said amplifier stages, a variable delay means, said connecting means comprising a channel switching means to alternately switch said variable delay means in series with said outputs of said amplifier stages, an incremental delay means having its input connected to said second input of said multiplier stage, means connecting the remaining input of the remaining one of said multiplier stages to the output of said incremental delay means, a first filter means having its input connected to the output of said first multiplier stage, a second filter means having its input connected to the output of said second multiplier stage, an amplitude comparator means having one of its inputs connected to the output of said first filter means and its remaining input connected to the output of said second filter means, means connecting the output of said amplitude comparator means to the controlling input of said variable delay means, switching means having its input connected to said output of said first filter and its output connected to said channel switching means for switching said variable delay means from one channel to the other, an automatic gain control means having its input connected to the output of one of said filters and means connecting the output of said automatic gain control means to the controlling inputs of said amplifier stages, whereby said outputs of said filters deliver signals which reflect vehicle velocity.

14. In a passive system for determining the speed of an object with respect to a reflecting surface, means for receiving in a pair of channels the radio frequency signals received from two different directions after reflection from said surface, means for placing said signals in approximate time correlation, means for applying the signals to a non-linear device so as to generate a frequency proportional to velocity of said object, and means for selecting said frequency from the output of the non-linear device and for applying it to means for generating appropriate velocity information.

15. In a passive system for determining the speed of an object with respect to a reflecting surface, means for receiving a plurality of radio frequency signals from a considerably remote source, at least one of which signals having been reflected by said surface from an area either fore or aft of the object, means for delivering two signals to non-linear devices, one of said signals having been delayed by an amount which compensates for the path length difference associated with the received signals, and means for selecting from the output of said non-linear device the Doppler frequency associated with the received signals, said Doppler frequency being a measure of the velocity of said object.

16. In a system for determining the velocity vector of an object with respect to a reflecting surface, means for receiving at least three radio frequency signals from an extra terrestrial source, at least two of which signals having been reflected by said surface from different areas either fore or aft of the object, means for delivering three signals to non-linear devices, two of said signals having been delayed by amounts which compensate for the path length differences associated with the received signals, and means for selecting from the output of said non-linear devices the Doppler frequencies associated with the received signals, said Doppler frequencies being a measure of the velocity vector of said object.

17. In a system as defined in claim 16, delay means for delaying at least one signal by an amount which compensates for path-length difference from said source by measuring the amplitude of the envelope of the correlation of the random signals at two values of delay, and means for comparing the amplitude of these two measurements to generate the error signal which can be used to adjust the delay line in such a way as to seek a zero error signal.

18. A method of measuring the velocity of a vehicle with respect to the earth utilizing radio frequency energy from an extra terrestrial source, at least some of said energy having been reflected from the earth prior to reception at the vehicle, comprising the steps of receiving at least two signals in the vehicle, comparing the frequencies of the received signals to produce an output signal representative of the correlation therebetween, and measuring said correlation to derive velocity information therefrom.

19. A system for obtaining an electrical signal dependent upon the velocity of an airborne vehicle which comprises, an aft-antenna for receiving the reflected cosmic noise frequencies in the radio frequency range from only an aft directive pattern, a fore-antenna for simultaneously receiving the reflected cosmic noise frequencies in the radio frequency range from only a forward directive pattern, means for simultaneously reducing the frequencies thus received at each antenna to a resulting lower band of intermediate frequencies, means for simultaneously amplifying the band of intermediate frequencies thus derived from the cosmic noise frequencies received at each antenna; multiplying the two amplified bands of intermediate frequencies to form the instantaneous product thereof, and means for filtering the said instantaneous product function, whereby the reflected cosmic noise incident on said fore and aft antennae is effectively correlated to provide the electrical signal as an index to velocity.

20. A system for obtaining an electrical signal dependent on airborne vehicle velocity which includes a fore antenna for receiving the cosmic noise frequencies in the radio frequency range reflected only from within a forwardly disposed directive pattern, an aft antenna for concurrently receiving the cosmic noise frequencies in the radio frequency range reflected only from within a rearwardly disposed directive pattern, means for reducing the forwardly-received frequencies thus obtained to a resulting forwardly-received intermediate frequency band, means for simultaneously reducing the rearwardly-received frequencies thus obtained to a resulting rearwardly-received intermediate frequency band, first and second amplifying means for simultaneously amplifying the forwardly-received and rearwardlly-received intermediate-frequency bands respectively, a multiplier stage coupled to receive the outputs of said first and second amplifying means for forming the product-function of the instantaneous values of said forwardly and rearwardly received intermediate frequencies, a filter stage coupled for forming and delivery therefrom of the filtered difference-frequency of the product-function as an electrical signal inherently dependent on vehicle velocity.

21. A system for deriving an electrical signal inherently dependent on airborne vehicle velocity which includes a first antenna for detecting the radio frequencies in cosmic noise reflected from ground areas behind said first antenna, a second antenna for simultaneously detecting the radio frequencies in cosmic noise reflected from ground areas ahead of said second antenna, means for simultaneously translating the groups of frequencies thus received at said first and second antennae to groups of resultant lower frequencies, means for simultaneously amplifying said resultant lower frequencies and deriving by cross-multiplication the product-function thereof, and an electric wave-filter coupled for receiving said product-function and for producing an output comprising the filtered product-function thereof, whereby, changes in the value of said filtered product-function occur as a result of the changes in the input frequencies caused by variations in vehicle velocity.

22. In an airborne vehicle provided with at least one antenna having a radiation pattern subtended only by aft ground-areas, and at least one antenna having a radiation pattern subtended only by forward ground-areas, a system for deriving a velocity signal dependent on the Doppler frequency shift occurring at both of said antennae which includes first and second means for detecting the free atmospheric radiation radio frequency reflecting only from within the ground area subtended by the radiation pattern at one of said antennas and the other of said antennas respectively, means for translating the frequencies thus received at each antenna to a lower position in the frequency spectrum as intermediate frequencies, means for amplifying the intermediate frequencies thus obtained, a multiplier-stage coupled for receiving the intermediate frequencies and forming the cross-products thereof, an electric wave-filter connected for passing said cross-products therethrough and thus deriving the filtered cross-product as an electrical output signal, whereby said filtered cross-product mirrors changes caused in the apparent frequencies received at said antennae by variations in vehicle velocity.

23. A system for deriving an electrical signal inherently dependent on airborne vehicle velocity which includes a first antenna for detecting the frequencies in cosmic noise in the radio frequency band reflected from a ground area related to said first antenna, a second antenna for simultaneously detecting the frequencies in cosmic noise in the radio frequency band reflected from a different ground area related to said second antenna, means for simultaneously translating the groups of frequencies thus received at said first and second antenna to groups of resultant lower frequencies, means for simultaneously amplifying said resultant lower frequencies and deriving by cross-multiplication the product-function thereof, and an electric wave-filter coupled for passing said product-function therethrough to secure the filtered product-function whereby changes in the frequency of said filtered product-function occur as a result of the changes in the instantaneous difference between the input frequencies caused by variations in the velocity of the vehicle in a direction parallel to a line connecting said ground areas.

24. A system for deriving an electrical signal inherently dependent on airborne vehicle velocity which includes a first antenna for detecting the frequencies in cosmic noise in the radio frequency range reflected from a ground area related to said first antenna, a second antenna for simultaneously detecting the frequencies in cosmic noise, in the radio frequency range reflected from a different ground area related to said second antenna, means for simultaneously amplifying groups of frequencies directly related to those thus received at said first and second antennae and deriving by cross-multiplication the product-function thereof, and an electric wave-filter coupled for passing said product-function therethrough to secure the filtered product-function whereby changes in the frequency of said filtered product-function occur as a result of the changes in the instantaneous difference between the input frequencies caused by variations in the velocity of the vehicle in a direction parallel to a line connecting said ground areas.

25. A system for deriving an electrical signal inherently dependent on airborne vehicle velocity which includes a first antenna for detecting the frequencies in cosmic noise in the radio frequency band reflected from a ground area related to said first antenna, a second antenna for simultaneously detecting the frequencies in cosmic noise in the radio frequency band reflected from a different ground area related to said second antenna, means for deriving by cross-multiplication the product-function of groups of frequencies directly related to those thus received at said first and second antennae, and an electric wave-filter coupled for passing said product-function therethrough to secure the filtered product-function whereby changes in the frequency of said filtered product-function occur as a result of the changes in the instantaneous difference between the input infrequencies caused by variations in the velocity of the vehicle in a direction parallel to a line connecting said ground areas.

References Cited in the file of this patent

UNITED STATES PATENTS

| | | |
|---|---|---|
| 2,403,625 | Wolfe | July 9, 1946 |
| 2,422,064 | Anderson et al. | June 10, 1947 |
| 2,430,357 | Mercer | Nov. 4, 1947 |
| 2,455,639 | Anderson | Dec. 7, 1948 |
| 2,458,654 | Southworth | Jan. 11, 1949 |
| 2,527,548 | Hastings | Oct. 31, 1950 |
| 2,866,373 | Doyle | Dec. 30, 1958 |